US009419725B2

(12) United States Patent
Grigoryan et al.

(10) Patent No.: US 9,419,725 B2
(45) Date of Patent: Aug. 16, 2016

(54) SYSTEMS AND METHODS FOR THE COMPENSATION OF NONLINEAR CROSS POLARIZATION AND CROSS PHASE MODULATION IN DUAL POLARIZATION COHERENT CHANNELS

(71) Applicants: Vladimir S. Grigoryan, Elkridge, MD (US); Michael Y. Frankel, Baltimore, MD (US)

(72) Inventors: Vladimir S. Grigoryan, Elkridge, MD (US); Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 83 days.

(21) Appl. No.: 14/482,776

(22) Filed: Sep. 10, 2014

(65) Prior Publication Data

US 2014/0376917 A1    Dec. 25, 2014

Related U.S. Application Data

(63) Continuation of application No. 13/589,470, filed on Aug. 20, 2012, now Pat. No. 8,861,960.

(51) Int. Cl.
*H04J 14/06* (2006.01)
*H04B 10/61* (2013.01)
*H04B 10/2507* (2013.01)

(52) U.S. Cl.
CPC ........ *H04B 10/6162* (2013.01); *H04B 10/2572* (2013.01); *H04J 14/06* (2013.01)

(58) Field of Classification Search
CPC .. H04B 10/2572; H04B 10/6162; H04J 14/06
USPC ......................................................... 398/65
See application file for complete search history.

(56) References Cited

U.S. PATENT DOCUMENTS

2008/0069183 A1*  3/2008  Terada ............... H04B 1/71635
                                                              375/137
2008/0159758 A1*  7/2008  Shpantzer .............. G02B 6/126
                                                              398/214

(Continued)

OTHER PUBLICATIONS

Takayuki Kobayashi ,Non linear Tolerant Spectrally—Efficient Transmission using PDM 64-QAM Single Carrier FDM with Digital Pilot-Tone—Journal of Lightwave Technology vol. 30 , No. 24, Dec. 15, 2012, pp. 3805-3813.*

(Continued)

*Primary Examiner* — David Payne
*Assistant Examiner* — Omar S Ismail
(74) *Attorney, Agent, or Firm* — Clements Bernard PLLC; Christopher L. Bernard; Lawrence A. Baratta, Jr.

(57) ABSTRACT

The present disclosure provides systems and methods for the compensation of signal distortion in fiber optic communication systems and the like. More specifically, the present disclosure provides an orthogonal polarization detection and broadband pilot (OPDBP) technique for the compensation of nonlinear cross polarization (i.e. nonlinear cross polarization modulation) (XPolM) induced noise and nonlinear nonlinear cross phase modulation (XPM) induced noise in a high data rate polarization multiplexed (PM) multilevel-quadrature amplitude modulated (M-QAM) channel due to neighboring channels. This approach allows for the compensation of both XPolM and XPM simultaneously, providing several dBs of optical reach extension. The approach uses a pilot tone based orthogonal polarization detection scheme with broadband (i.e. a few GHz wide) filtering of the pilot tones.

20 Claims, 6 Drawing Sheets

(56) References Cited

U.S. PATENT DOCUMENTS

| | | | | |
|---|---|---|---|---|
| 2010/0021166 | A1* | 1/2010 | Way | H04J 14/02 398/79 |
| 2011/0026860 | A1 | 2/2011 | Taylor et al. | |
| 2011/0033182 | A1* | 2/2011 | Haunstein | H04B 10/60 398/26 |
| 2011/0142455 | A1 | 6/2011 | Lin et al. | |
| 2011/0255870 | A1* | 10/2011 | Grigoryan | H04B 10/548 398/65 |
| 2012/0106980 | A1 | 5/2012 | Lyubomirsky et al. | |
| 2012/0148264 | A1* | 6/2012 | Liu | H04B 10/61 398/202 |
| 2012/0263464 | A1* | 10/2012 | Koike-Akino | H04B 10/6162 398/65 |

OTHER PUBLICATIONS

Vladimir S. Grigoryan, Michael Y. Frankel; "Compensation of Nonlinear Cross Polarization and Cross Phase Modulation in a 112Gb/s 7x4Gbaud PDM Coherent OFDM Channel Caused by 10Gb/s OOK Neighbors"; Ciena Corporation, Abstract Paper, 2009, pp. 1-3.

M. Birk, P. Gerard, R. Curton, L. Nelson, X. Zhou, P. Magill, T.J. Schmidt, C. Malouin, B. Zhang, E. Ibragimov, S. Khantana, M. Glavanovic, R. Lofland, G. Nicholls, M. Nowell, and F. Forghieri; "Field trial of a real-time, single wavelength, coherent 100 Gbit/s PM-QPSK channel upgrade of an installed 1800km link"; (c) 2010 IEEE, pp. 1-3.

Danish Rafique, Jian Zhao, and Andrew D. Ellis; Paper—"Compensation of nonlinear fibre impairments in coherent systems employing spectrally efficient modulation formats"; The Institute of Electronics, Information and Communication Engineers—Copyright (c) 2010, pp. 1-8.

F. Curti, B. Daino, Q. Mao, F. Matera; "Concatenation of Polarisation Dispersion in Single-Mode Fibres"; Electronics Letters Feb. 16, 1989, vol. 25, No. 4—Authorized to: University of Maryland, Baltimore City, Downloaded Feb. 8, 2010 from IEEE Xplore, pp. 290-292.

Mohamed H. Morsy-Osman, Lawrence R. Chen and David V. Plant; "Joint Mitigation of Laser Phase Noise and Fiber Nonlinearity Using Pilot-Aided Transmission for Single-Carrier Systems"; Abstract—ECOC Technical Digest (c) 2011 OSA, pp. 1-3.

B. Inan, S. Randel, S.L. Jansen, A. Lobato, S. Adhikari, N. Hanik; "Pilot-Tone-based Nonlinearity Compensation for Optical OFDM Systems" Institute of Communications Engineering, Munich, Germany; (c) 2010 IEEE, pp. 1-3.

Kim Roberts and Ian Roberts; "DSP: A Disruptive Technology for Optical Transceivers"; Nortel Networks, Ottawa, ON CA; ECOC 2009, Sep. 20-24, 2009, Viena, Austria, pp. 1-4.

Lei Li, Zhenning Tao, Ling Liu, Weizhen Yan, Shoichiro Oda, Takeshi Hoshida, and Jens C. Rasmussen; "Nonlinear Polarization Crosstalk Canceller for Dual-Polarization Digital Coherent Receivers"; Abstract—OSA / OFC / NFOEC 2010, pp. 1-3.

Emmanuel Le Taillandier De Gabory, Manabu Arikawa, Daisaku Ogasahara, and Kiyoshi Fukuchi; "Mixed Bit Rate DWDM Transmission of 112Gb/s PM-QPSK Signals over a Dispersion Managed Link using Real-Time DSP to Assess Nonlinear Distortions"; Abstract—ECOC Technical Digest (c) 2011 OSA, pp. 1-3.

Akihide Sano, Eiichi Yamada, Hiroji Masuda, Etsushi Yamazaki, Takayuki Kobayashi, Eiji Yoshida, Yutaka Miyamoto, Ritchi Kudo, Koichi Ishihara, and Yasushi Takatori, "No-Guard-Interval Coherent Optical OFDM for 100-Gb/s Long-Haul WDM Transmission," Journal of Lightwave Technology, vol. 27, No. 16, Aug. 15, 2009, pp. 3705-3713.

T. Kobayashi, A. Sano, A. Matsuura, M. Yoshida, T. Sakano, H. Kubota, Y. Miyamoto, K. Ishihara, M. Mizoguchi, and Magatani; Abstract—"45.2Tb/s C-band WDM transmission over 240km using 538Gb/s PDM-64QAM single carrier FDM signal with digital pilot tone"; ECOC Postdeadline Papers (c) 2011 OSA, pp. 1-3.

Liang B. Du and Arthur J. Lowery, "Improved single channel backpropagation for intra-channel fiber nonlinearity compensation in long-haul optical communication systems," Aug. 2, 2010, Optics Express, vol. 18 No. 16, pp. 17075-17088.

Phillips, Mary R., Sheryl L. Woodward, and Robin L. Smith, "Cross-Polarization Modulation: Theory and Measurement in Subcarrier-Modulated WDM Systems," Journal of Lightwave Technology, vol. 24, No. 11, Nov. 2006, pp. 4089-4099.

* cited by examiner

SYSTEMS AND METHODS FOR THE COMPENSATION OF NONLINEAR CROSS POLARIZATION AND CROSS PHASE MODULATION IN DUAL POLARIZATION COHERENT CHANNELS

CROSS-REFERENCE TO RELATED APPLICATION(S)

The present non-provisional patent application/patent is a continuation of U.S. patent application Ser. No. 13/589,470, filed on Aug. 20, 2012, and entitled "SYSTEMS AND METHODS FOR THE COMPENSATION OF NONLINEAR CROSS POLARIZATION AND CROSS PHASE MODULATION IN DUAL POLARIZATION COHERENT CHANNELS," the contents of which are incorporated in full by reference herein.

FIELD OF THE DISCLOSURE

The present disclosure relates generally to systems and methods for the compensation of signal distortion in fiber optic communication systems and the like. More specifically, the present disclosure relates to an orthogonal polarization detection and broadband pilot (OPDBP) technique for the compensation of nonlinear cross polarization (i.e. nonlinear cross polarization modulation) (XPolM) induced noise and nonlinear cross phase modulation (XPM) induced noise in a high data rate polarization multiplexed (PM) multilevel-quadrature amplitude modulated (M-QAM) channel due to neighboring channels.

BACKGROUND OF THE DISCLOSURE

Given the prevailing progressive fiber optic transmission system upgrade approach, high data rate PM (i.e. 100 Gb/s, 200 Gb/s, etc.) channels must coexist with legacy on-off keying (OOK) neighboring channels in the links designed for such legacy OOK signals. However, numerous field trials and laboratory experiments have revealed a significant nonlinear cross talk penalty in a coherent 100 Gb/s channel, for example, due to XPolM, or nonlinear polarization cross talk, and XPM caused by 10 Gb/s OOK neighboring channels, for example. This nonlinear cross talk penalty reduces the unregenerated reach of high data rate PM signals by several dBs on dispersion compensated links, including non-dispersion shifted fiber (NDSF) and non-zero dispersion shifted fiber (NZDSF), for example. This occurs on most legacy terrestrial and submarine links.

Existing state-of-the-art approaches for dealing with nonlinear XPolM induced noise and nonlinear XPM induced noise can be divided into four general categories: (1) coherent polarization division multiplexed (PDM) systems relying on high speed analog to digital converter/digital signal processing (ADC/DSP) in order to track the polarization variations of the signals due to XPolM and the phase variations of the signals due to XPM; (2) the use of pilot tones to compensate for the inter-channel nonlinear penalties; (3) the use of feed forward DSP and train bit sequences to compensate for XPolM; and (4) the use of DSP based nonlinear back propagation to compensate for intra-channel (i.e. inside a single channel) nonlinear systematic distortions. The drawbacks of these approaches are as follows.

The speed of polarization and phase tracking in conventional coherent PDM systems, relying on high speed ADC/DSP, is typically limited to less than 1 MHz due to the data processing speed and data acquisition scheme. As a consequence, polarization variations of the signals due to XPolM and phase variations of the signals due to XPM, occurring at the speed of ~1 GHz due to the 10 Gb/s neighboring channels, are far beyond the capabilities of polarization and phase tracking in conventional coherent PDM systems.

In the pilot based approaches that have been proposed for orthogonal polarization detection in PDM systems, the bandwidth of the low pass filters (LPFs) that filter the pilots have been restricted to not more than 100 MHz, to minimize the amplified spontaneous emission (ASE) noise impact. As later analysis has shown, the overwhelming amount of the nonlinear noise due to the nonlinear XPM and XPolM is located in the 1 GHz to 3 GHz spectral range. By this reasoning, the orthogonal polarization approach with pilot filtering within less than 100 MHz bandwidth proposed is only capable of improving the quality (Q) factor by about 0.5 dB. One pilot based nonlinear compensation approach proposed allows for a 2.4 dB Q factor improvement in a single polarization wavelength division multiplexing (WDM) transmission. However, this approach is only capable of compensating the XPM and self phase modulation (SPM), and it does not allow for the compensation of the nonlinear cross polarization noise due to XPolM in PDM systems. Another pilot aided approach proposed has been demonstrated to a yield a fairly limited (i.e. less than 0.6 dB) Q factor improvement in a coherent PDM system due to partial XPM compensation. Numerous alternative pilot aided approaches for XPM compensation also yield limited Q factor improvement, within 1 dB. Note that these approaches do not compensate for XPolM. A further pilot aided approach proposed allows only for a modest 0.5 dB increase in tolerable launch power. Likewise, a pilot tone based approach proposed allows for up to 0.5 dB improvement in the nonlinear tolerance. A still further pilot aided approach allows for a 1 dB increase of the launch power, resulting in a modest 9% increase in a maximum system reach.

The methods that use feed forward DSP and train bit sequences to compensate for XPolM also yield a limited (i.e. 1 dB) Q factor improvement. The reason for this is twofold. First, the train sequences are limited to about 0.1 microseconds, which cuts off the polarization variations beyond 10 MHz. Second, the nonlinear signal phase variations due to XPM remain uncompensated for in this approach.

Finally, digital back propagation that is applied within a single channel bandwidth only produces very limited benefit (i.e. under 1 dB) in a WDM environment, as it does not compensate for the inter-channel XPM and XPolM. Multi-channel bandwidth digital back propagation is able to provide much higher gains, but is not implementable in any realistic term DSP technology.

BRIEF SUMMARY OF THE DISCLOSURE

In various exemplary embodiments, the present disclosure provides systems and methods for the compensation of signal distortion in fiber optic communication systems and the like. More specifically, the present disclosure provides an OPDBP technique for the compensation of nonlinear XPolM induced noise and nonlinear XPM induced noise in a high data rate PM M-QAM channel due to neighboring channels. This approach allows for the compensation of both XPolM and XPM simultaneously, providing several dBs of optical reach extension. The approach uses a pilot tone based orthogonal polarization detection scheme with broadband (i.e. a few GHz wide) filtering of the pilot tones.

The numerical illustration of the OPDBP operation provided is performed with 112 Gbps PDM—orthogonal frequency division multiplexed (OFDM)—quadrature phase shift keying (QPSK) test channels with 10 Gbps non-return-to-zero (NRZ) neighboring channels, but applies to a wide range of both test channel and neighboring channel modulation formats. The OPDBP operation is shown to provide more than 4 dB Q factor improvement without intra-subcarrier polarization mode dispersion (PMD) compensation in a 10×100 km NDSF system with 90% inline optical dispersion compensation. With the intra-subcarrier PMD compensation, more than 5 dB Q factor improvement is provided.

Central features of these OPDBP systems and methods include: (1) the use of pilot tones on orthogonal polarizations that are fully separable in frequency prior to the polarization demultiplexing of electrical data signals; (2) the use of pilot tones to provide polarization demultiplexing capability to the data signals directly, thereby automatically compensating for common mode phase noise terms, both linear laser related and nonlinear cross talk related; and (3) a dynamically selected, optimized choice of the bandwidth for filtering the pilot tones within the sub-GHz to several GHz range.

Current state of the art high data rate, PM channels are substantially penalized by co-propagating channels with high power excursions on a time scale of bits. For example, 100 Gbps PDM-QPSK channels are penalized by several dBs by co-propagating 10 Gbps non-return to zero (NRZ) channels on optically dispersion compensated links. The OPDBP approach of the present disclosure has several notable benefits over the existing state of the art: (1) it provides a way to substantially improve tolerance to inter-channel (i.e. from adjacent neighboring channels) nonlinear cross talk, such as XPolM and XPM (by as much as several dBs); (2) it provides a way to dynamically optimize channel performance, depending on a performance limiting mechanism, whether linear ASE noise or nonlinear cross-talk; (3) it provides a convenient way to substantially increase tolerance to laser phase noise; (4) it provides a convenient way to simplify polarization demultiplexing in receiver electronics; and (5) it enables excellent unregenerated reach for high capacity upgrades via coherent channels to existing dispersion compensated links, both terrestrial and submarine.

In one exemplary embodiment, the present disclosure provides a system for the simultaneous compensation of nonlinear cross polarization modulation induced noise and nonlinear cross phase modulation induced noise in a high data rate polarization multiplexed channel due to neighboring channels, including: a receiver operable for receiving spectrally separable pilot tones in same states of polarization as polarization channels, down converting associated pilot tone vectors to a baseband, separating the pilot tone vectors with a sufficient bandwidth, down converting subcarrier signal vectors to the baseband, and taking scalar products of the various vectors, a conj (first polarization pilot vector) x (signal vector) first scalar product and a conj (second polarization pilot vector) x (signal vector) second scalar product, wherein the first scalar product restores an original first polarization channel launched into a link at a first polarization and the second scalar product restores an original second polarization channel launched into the link at a second polarization; wherein the sufficient bandwidth around a first polarization pilot tone and a second polarization pilot tone is sufficient to simultaneously capture nonlinear cross phase modulation induced polarization variation and nonlinear cross phase modulation induced phase variation. The system also includes a transmitter operable for placing the spectrally separable pilot tones in the same states of polarization as the polarization channels. Optionally, the first polarization is a horizontal polarization and the second polarization is a vertical polarization. Optionally, the polarization multiplexed channel is a multilevel-quadrature amplitude modulated polarization multiplexed channel. The system further includes a low pass filter operable for broadband filtering the pilot tones in a sub-GHz to few GHz range. The sufficient bandwidth is determined by an optimization between the compensation of nonlinear cross polarization modulation induced noise and nonlinear cross phase modulation induced noise and degradation due to amplified spontaneous emission noise as the sufficient bandwidth increases. The systems still further includes means for performing intra-subcarrier polarization mode dispersion compensation and optical dispersion compensation. The system still further includes a polarization division multiplexing hybrid.

In another exemplary embodiment, the present disclosure provides a method for the simultaneous compensation of nonlinear cross polarization modulation induced noise and nonlinear cross phase modulation induced noise in a high data rate polarization multiplexed channel due to neighboring channels, including: at a receiver, receiving spectrally separable pilot tones in same states of polarization as polarization channels, down converting associated pilot tone vectors to a baseband, separating the pilot tone vectors with a sufficient bandwidth, down converting subcarrier signal vectors to the baseband, and taking scalar products of the various vectors, a conj (first polarization pilot vector) x (signal vector) first scalar product and a conj (second polarization pilot vector) x (signal vector) second scalar product, wherein the first scalar product restores an original first polarization channel launched into a link at a first polarization and the second scalar product restores an original second polarization channel launched into the link at a second polarization; wherein the sufficient bandwidth around a first polarization pilot tone and a second polarization pilot tone is sufficient to simultaneously capture nonlinear cross phase modulation induced polarization variation and nonlinear cross phase modulation induced phase variation. The method also includes, at a transmitter, placing the spectrally separable pilot tones in the same states of polarization as the polarization channels. Optionally, the first polarization is a horizontal polarization and the second polarization is a vertical polarization. Optionally, the polarization multiplexed channel is a multilevel-quadrature amplitude modulated polarization multiplexed channel. The method further includes, at a low pass filter, broadband filtering the pilot tones in a sub-GHz to few GHz range. The sufficient bandwidth is determined by an optimization between the compensation of nonlinear cross polarization modulation induced noise and nonlinear cross phase modulation induced noise and degradation due to amplified spontaneous emission noise as the sufficient bandwidth increases. The method still further includes performing intra-subcarrier polarization mode dispersion compensation and optical dispersion compensation. The method still further includes transmitting a demultiplexed polarization multiplexed channel to a polarization division multiplexing hybrid.

In a further exemplary embodiment, the present disclosure provides a system for the simultaneous compensation of nonlinear cross polarization modulation induced noise and nonlinear cross phase modulation induced noise in a high data rate polarization multiplexed channel due to neighboring channels, including: a transmitter operable for placing spectrally separable pilot tones on orthogonal horizontal and vertical polarizations associated with the polarization multiplexed channel prior to multiplexing the polarization multiplexed channel with the neighboring channels; and a receiver operable for down converting the pilot tones from the orthogonal horizontal and vertical polarizations to a baseband and separating the pilot tones subsequent to demultiplexing the polarization multiplexed channel from the neighboring channels and; wherein a sufficient bandwidth is provided around the horizontal polarization pilot tone and the vertical polarization pilot tone such that the receiver can simultaneously capture nonlinear cross phase modulation induced polarization variation and nonlinear cross phase modulation induced phase variation. The receiver is operable for taking two scalar products of two vectors, a conj (horizontal polarization pilot vector) x (signal vector) first scalar product and a conj (vertical polarization pilot vector) x (signal vector) second scalar product, wherein the first scalar product restores an original horizontal polarization channel and the second scalar product restores an original vertical polarization channel.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
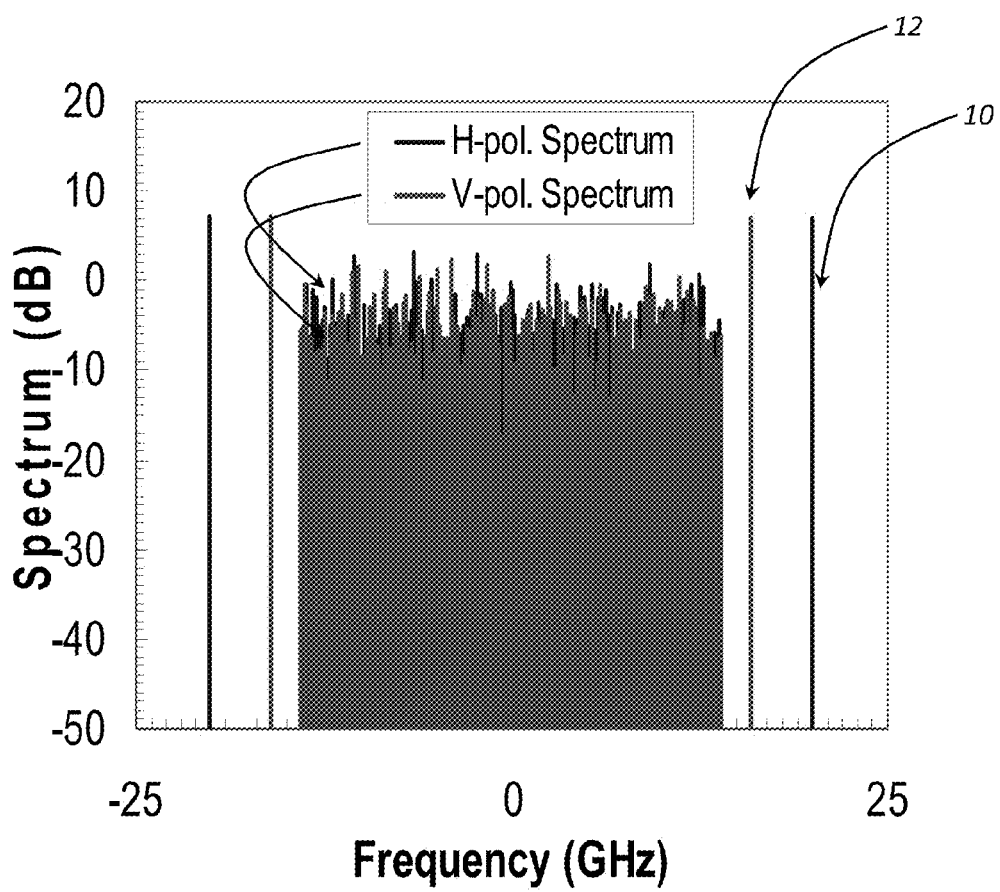
FIG. 1 is a spectral diagram illustrating a 112 Gb/s PDM OFDM signal carrying 7×4 Gbaud QPSK subcarriers (SCs) in each polarization in accordance with the OPDBP systems and methods of the present disclosure.

In one exemplary embodiment, the OPDBP concept of the present disclosure is illustrated in FIG. 1, which shows a spectral diagram of a 112 Gb/s PDM OFDM signal carrying 7×4 Gbaud QPSK SCs in each polarization. Two pilot tones per polarization, launched in phase with the I-component of the signal in the same polarization are placed symmetrically around the center, with the horizontally polarized (H-pol) pilots 10 at $v_{pH1,2}=\pm 20$ GHz and the vertically polarized (V-pol) pilots 12 at $v_{pV1,2}=\pm 16$ GHz. Suppose that the PMD, polarization dependent loss (PDL), and ASE are negligible. Then, in a linear propagation regime, a pilot field vector in the H-pol will always remain co-polarized with the H-pol signal field vector, $\vec{E}_H$, and orthogonal to the V-pol signal field vector, $\vec{E}_V$. Consequently, at the fiber output, a scalar product of the H-pol pilot, $\vec{E}_{pH}$, filtered from the SCs, and the m-th SC (m=1÷7) signal, $\vec{E}_m$ (both down converted to the baseband separately) is:

$$\vec{E}^*_{pH} \cdot \vec{E}_m = |E_p| E_{mH0}, \qquad (1)$$

restoring the original m-th SC H-pol fiber input field, $E_{mH0}$. In this formula, the $|E_p|$ pilot amplitude acts as a real scaling constant, as it does not appreciably vary over time for a continuous wave external cavity or regular distributed feedback (DFB) lasers. Similarly, a scalar product of the V-pol pilot, $\vec{E}_{pV}$, and the signal (both down converted to the baseband separately):

$$\vec{E}^*_{pV} \cdot \vec{E}_m = |E_p| E_{mV0}, \qquad (2)$$

restores the original m-th SC V-pol fiber input field, $E_{mV0}$. For a non-zero PMD, the simple formulas (1) and (2) do not work anymore, as the pilot state of polarization (SOP) is different from the signal SOP. The fiber Jones matrix in the $1^{st}$ order PMD for a fully compensated chromatic dispersion (CD) depends on frequency, $\omega$, as:

$$\hat{J}(\omega) = \hat{R}_1 \mathrm{diag}[e^{i\omega\tau/2}, e^{-i\omega\tau/2}] \hat{R}_2, \qquad (3)$$

where $\hat{R}_{1,2}$ are $\omega$-independent unitary matrices related to the output and input principal SOPs, respectively, and $\tau$ is a differential group delay (DGD). However, given the Jones matrix (3) above, the correct pilots, $\vec{E}_{pHm,pVm}$, for any m-th SC at center frequency, $\omega_m$, in H-pol and V-pol can still be extracted from a linear combination of the two pilots in the same polarization. This linear combination is:

$$\vec{E}_{pHm,pVm} = \alpha_{Hm,Vm} \vec{E}_{pH1,pV1} + \beta_{Hm,Vm} \vec{E}_{pH2,pV2}, \qquad (4a)$$

with the coefficients given by:

$$\alpha_{Hm,Vm} = \frac{e^{i\omega_m \frac{\tau}{2}} - e^{i(\omega_{pH2,pV2}\tau - \omega_m\tau/2)}}{e^{i\omega_{pH1,pV1}\tau} - e^{i\omega_{pH2,pV2}\tau}} e^{i\omega_{pH1,pV1}\tau/2}, \qquad (4c)$$

$$\beta_{Hm,Vm} = \frac{e^{i(\omega_{pH1,pV1}\tau - \omega_m\tau/2)}}{e^{i\omega_{pH1,pV1}\tau} - e^{i\omega_{pH2,pV2}\tau}} e^{i\omega_{pH1,pV1}\tau/2},$$

where $\vec{E}_{pH1,2}$ and $\vec{E}_{pV1,2}$ are the two H-pol and V-pol pilots 10 and 12 at $\omega_{pH1,2}$ and $\omega_{pV1,2}$ frequencies, respectively, down converted to the baseband. When $\tau=0$, equations 4b and 4c reduce the frequency weighted coefficients to between 0 and 1. Care has to be taken in choosing the pilot arrangement to avoid singularities in equations 4b and 4c within the $\tau$ dynamic range of interest. The $\vec{E}_{pHm}$ and $\vec{E}_{pVm}$ could be called the "eigen-pilots," as if they had been copropagating with the m-th SC at its center frequency remaining co-polarized with it. With these eigen-pilots, again, the $\vec{E}^*_{pHm} \cdot \vec{E}_m = |E_p| E_{mH0}$ scalar product restores the H-pol m-th SC fiber input field signal, $E_{mH0}$, whereas the scalar product $\vec{E}^*_{pVm} \cdot \vec{E}_m = |E_p| E_{mV0}$ restores the V-pol m-th SC fiber input field signal, $E_{mV0}$.

Figure 2:
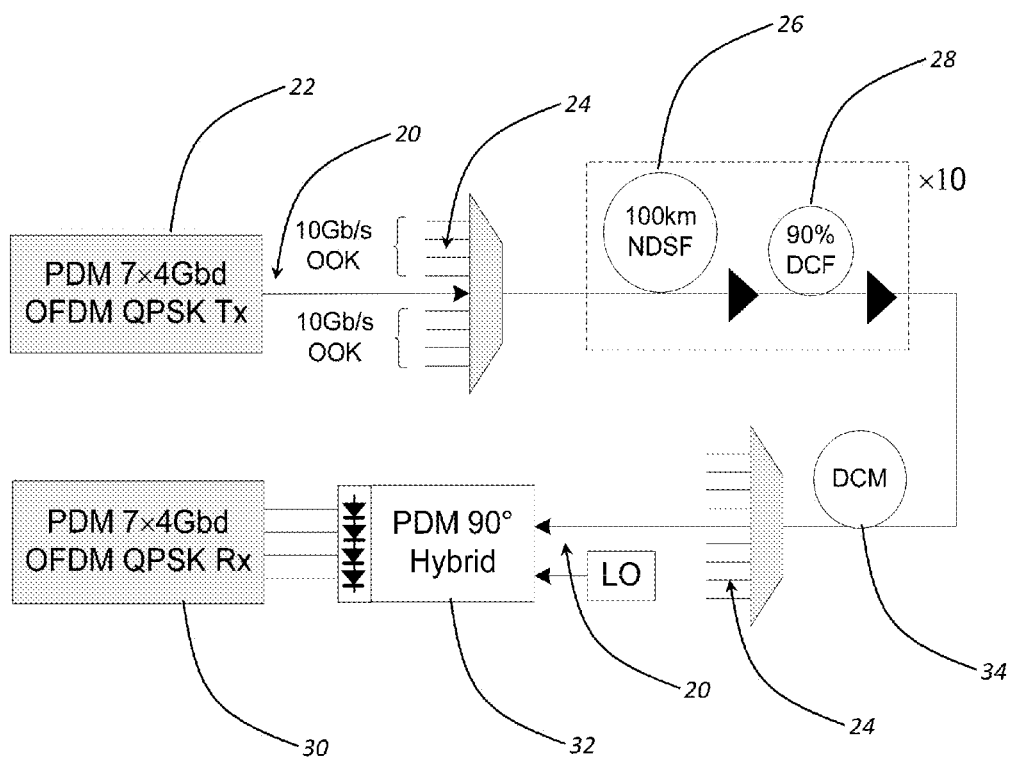
FIG. 2 is a schematic diagram illustrating a system for the transmission of a 112 Gb/s PDM 7×4 Gbaud OFDM QPSK channel surrounded by 8×10 Gb/s OOK channels in accordance with the OPDBP systems and methods of the present disclosure.

Referring now to FIG. 2, in one exemplary embodiment, a 112 Gb/s channel 20 from a PDM 7×4 Gbaud OFDM QPSK transmitter (Tx) 22 is multiplexed with 8 single polarization 10 Gb/s OOK channels 24, 4 on each side of the former with 50 GHz channel spacing, and launched into a 10×100 km NDSF fiber 26 with 90% dispersion compensation per span using slope matched dispersion compensating fiber (DCF) 28, an erbium doped fiber amplifier (EDFA) noise figure of 6 dB, and the launch power into the DCF 28 being 3 dB lower than the launch power into the NDSF 26. A dispersion compensation module 34 may also be utilized. At the receiver (Rx) 30, the residual dispersion is fully compensated—the 112 Gb/s channel 20 is demultiplexed and sent to a PDM 90 degree hybrid 32 followed by the PDM 7×4 Gbaud OFDM QPSK Rx 30. A fast Fourier transform (FFT) based optical OFDM type transmitter 22 is used to generate the PDM 7×4 Gbaud OFDM QPSK signal in each of the H-pol and the V-pol. Inserting 2 pilots per polarization is realized by adding 2 unmodulated tones at ±16 GHz in the V-pol and ±20 GHz in the H-pol. On the receiver side, the signal is 100% dispersion compensated at DCM 34, wavelength demultiplexed, and sent to the hybrid (analog/digital) dual-polarization coherent detector 30 operating based on the OPDBP scheme. The operation scheme in the hybrid (analog/digital) dual-polarization coherent detector 30 is as follows. The radio frequency (RF) complex signals in the X and Y polarizations at the balanced photodetector output are each split into 2×(7+4) tributaries, mixed with RF tones from a 4 GHz spaced RF tone comb generator (with cophased tones) using parallel Gilbert type RF mixers in order to down convert each of the 2×7 SCs and 2×4 pilots, $E_{nx,ny}$ (n=1÷11), to the baseband individually and produce the signals, $X_n, Y_n = G^* E^*_{LOx,LOy} E_{nx,ny}$, where G is a complex amplitude of the RF comb generator n-th tone and $E_{LOx,LOy}$ is a local oscillator X-pol and Y-pol fields. The 4 RF X and Y complex pilot signals are then filtered with a LPF and sent to a GHz speed DSP block comprising 16 parallel ADCs, a processor, and 28 parallel digital to analog converters (DACs). Injection locking of the RF comb generator with the 20 GHz pilot tone keeps the pilots at the LPF center irrespective of the source versus local oscillator (LO) external cavity lasers frequency mismatch. The purpose of the DSP block is to generate 14 complex $P_{HXm,VXm} = G^* E^*_{LOx} E_{pHm,pVm}^x$ and 14 complex $P_{HYm,VYm} = G^* E^*_{LOy} E_{pHm,pVm}^y$ eigen-pilots using the equations (4) based on a digital tracking of DGD τ in a single dimension space with a low speed error signal derived from a decision circuit. Pol-dependent CD in higher order PMD would result in τ depending on $\omega_m$. Using a set of 14 parallel RF complex mixers and 7 parallel RF complex adders, the following signals are generated:

$$E_{sm}^H = P^*_{HXm} X_m + P^*_{HYm} Y_m = 0.5|G|^2 |E_{LO}|^2 |E_p| E_{mH0},$$

$$E_{sm}^V P^*_{VXm} X_m + P^*_{VYm} Y_m = 0.5|G^2 |E_{LO}|^2 |E_p| E_{mV0}, \quad (5)$$

(m=1÷7), which restore the original H-pol and V-pol m-th SC QPSK signals, $E_{mH0}$ and $E_{mV0}$. Alternatively, the 112 Gb/s PDM 7×4 Gbaud OFDM QPSK signal can be received by a high speed ADC and DSP based receiver 30. In the later case, the detection algorithm is still based on the OPDBP scheme using equation (5), while the dispersion, PMD, and PDL compensation can be realized digitally. Thus, in this disclosure, two cases related to these two different receiver architectures, by way of example, and not by way of limitation, include the following:
1. Analog Gilbert cell mixer based receiver with relatively low speed (i.e. a few GHz) DSP; and
2. Conventional high speed ADC and DSP based receiver with PMD fully compensated digitally.

Figure 3:
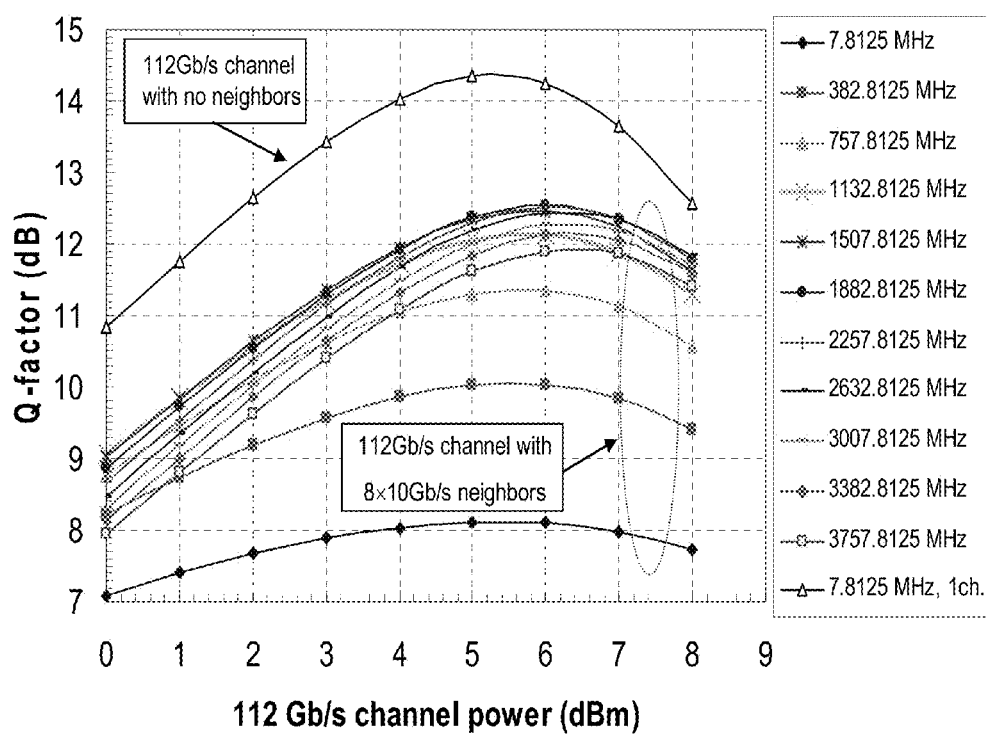
FIG. 3 is a plot illustrating Q factor versus channel power for various LPF bandwidths (10 Gb/s are at 1 dBm/ch, differential group delay (DGD)=11.24 ps., 112 Gb/s channel with no neighboring channels curve is a reference) in accordance with the OPDBP systems and methods of the present disclosure.
Figure 4:
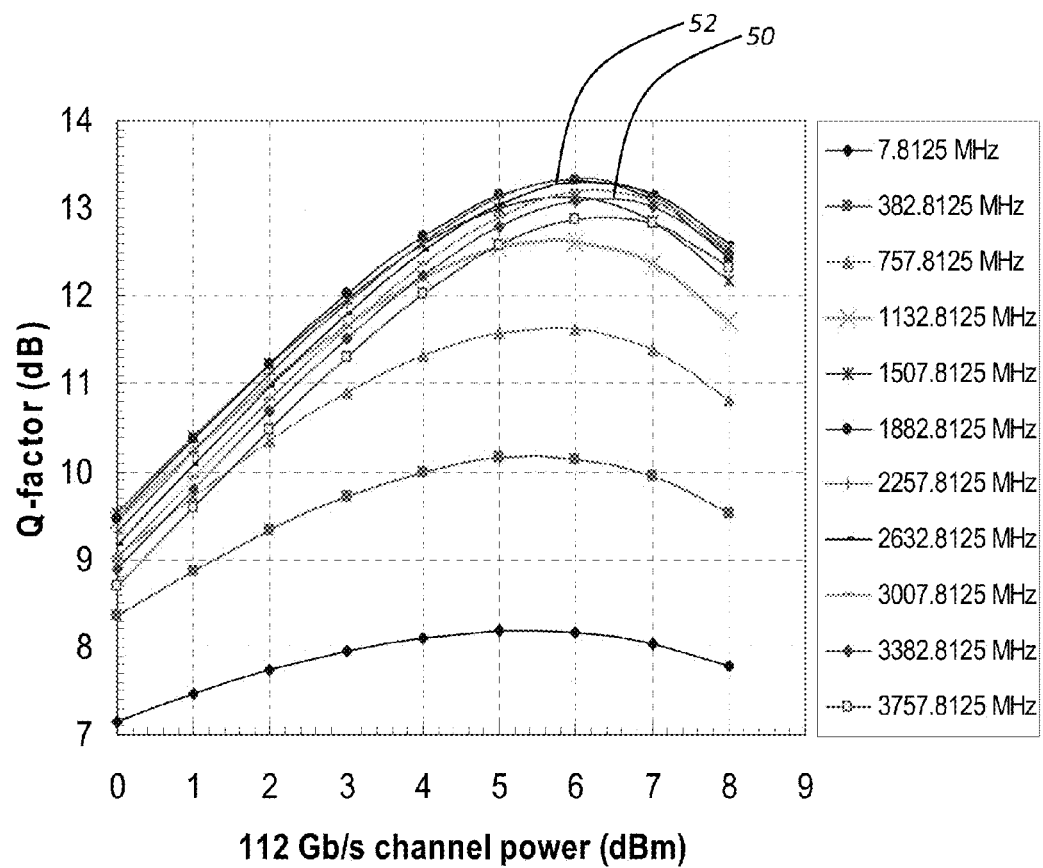
FIG. 4 is another plot illustrating Q factor versus channel power for various LPF bandwidths (but DGD=0 ps, 10 Gb/s are still at 1 dBm/ch, all other system parameters are the same as in FIG. 3) in accordance with the OPDBP systems and methods of the present disclosure.
Figure 5:
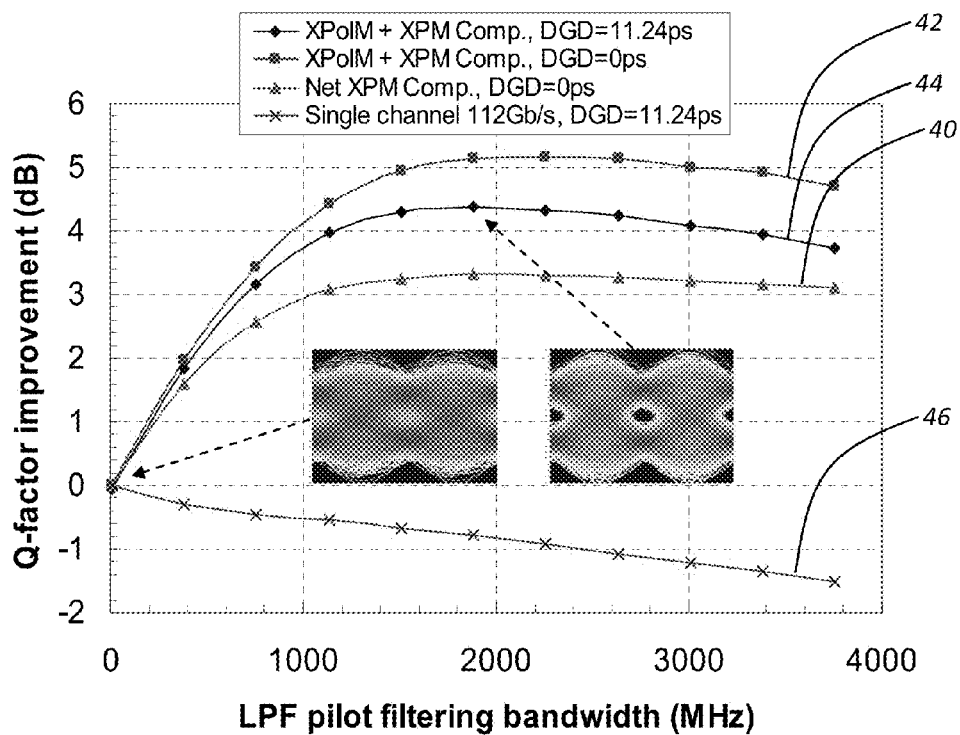
FIG. 5 is a further plot illustrating Q factor improvement at optimum channel power versus pilot LPF bandwidth (the left inset relates only to the diamond curve and the right insets are H-pol eye diagrams, the cross curve is a negative Q improvement for a single 112 Gb/s channel relative to its maximum Q=14.34 dB at 5 dBm in FIG. 3 for 7.8125 MHz LPF)
Figure 6:
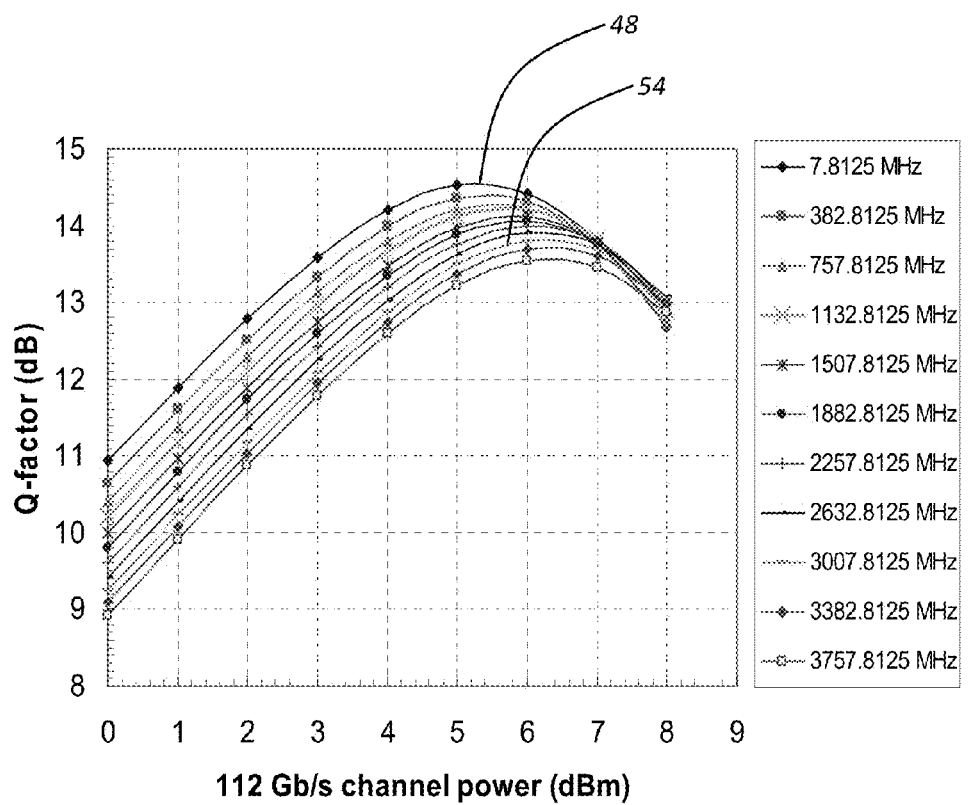
FIG. 6 is a still further plot illustrating Q factor for a single 112 Gb/s PDM 7×4 Gbaud OFDM QPSK channel with no 10 Gb/s neighboring channels over 10×100 km NDSF fiber with 90% dispersion compensation per span versus channel power for various LPF bandwidths and DGD=0 ps (all other system parameters are the same as those used in FIGS. 3-5).

In simulations, a 512 bit sequence (with 7.8125 MHz FFT resolution) in each of the HI, HQ, VI, and VQ components for each of the 7×4 Gbaud SCs was set using a rand() function, choosing only those realizations that yield equal number of ones and zeros. The pilot power to channel power ratio was set to −4.342 dB. A root raised cosine Nyquist filter with a rolloff factor of 1.e-3 was used at the Tx and Rx. The neighboring single pol OOK NRZ channels at 10.78 Gb/s were all launched at 45 degrees to the H-pol of the test channel. FIG. 3 shows the dependence of the Q factor computed over all the in phase H-pol, quadrature H-pol, in phase V-pol, and quadrature V-pol signals in 7 SCs versus the 112 Gb/s channel power for various rectangular shaped (amplitude) LPF bandwidths for pilot filtering for DGD=11.24 ps corresponding to 3.3× ⟨DGD⟩, where ⟨DGD⟩ is the average DGD of the fiber link. In FIG. 3, it is assumed that, first, the analog Gilbert cell mixer based receiver outlined above is used and, second, the complex eigen-pilots are generated in the relatively low speed (i.e. a few GHz) DSP block using the equations (4) based on a digital tracking of DGD in a single dimension space with a low speed error signal derived from a decision circuit (case 1). Note that, in this case, the PMD within the SC bandwidth remains uncompensated. It is evident that the Q factor increases as the LPF bandwidth increases and the optimum channel power drifts from 5 dBm at 7.8125 MHz to 6 dBm at 2.258 GHz LPF bandwidth. When a conventional coherent optical OFDM receiver with a high speed ADC and DSP is used (case 2), it may be assumed that the PMD is fully compensated by using a digital butterfly finite impulse response filter, such that the residual DGD is zero. For the zero DGD case, in FIG. 4, similar to FIG. 3, the Q factor is illustrated, computed over all of the in phase H-pol, quadrature H-pol, in phase V-pol, and quadrature V-pol signals in 7 SCs versus the 112 Gb/s channel power for various rectangular shaped (amplitude) LPF bandwidths for pilot filtering. The results of FIGS. 3 and 4 are summarized in FIG. 5, which shows the Q factor improvement (relative to the optimum Q factor at the smallest LPF bandwidth of 7.8125 MHz) at optimum channel power versus the LPF bandwidth for DGD=11.24 ps and DGD=0 ps. A significant Q factor improvement of 5.15 dB at DGD=0 ps achieved at the LPF bandwidth of 2.258 GHz is due to both high speed XPolM and XPM noise compensation. To confirm this, the XPolM part (the triangles curve 40 in FIG. 5) was excluded from the Q improvement. This was accomplished using a narrowband (i.e. one sample wide) filtering of the pilots and polarization demultiplexing the signals and the broadband pilots using the narrow band pilots according to the pol-demuxing equations (5), thereby cutting off the high speed cross polarization components. Finally, the average of the two polarization demultiplexed pilots in each polarization was filtered with various LPF bandwidths and multiplied by the pol-demuxed and Nyquist filtered SC field in respective polarization in order to compensate for high speed XPM. As a result, the maximum Q factor improvement in FIG. 5 is reduced from 5.15 dB (the squares curve 42) to 3.34 dB (the triangles curve 40), thereby indicating that a differential 1.81 dB improvement is due to the net high speed XPolM noise compensation. When DGD=11.24 ps and (the diamonds curve 44 in FIG. 5), the maximum Q factor improvement is reduced from 5.15 dB to 4.37 dB, assuming a perfect DGD tracking. The reduction by 0.78 dB is due to the residual PMD within the 4 GHz SC bandwidth, which remains uncompensated. At the LPF bandwidth above 2.258 GHz, the Q improvement is reduced due to the ASE noise impact. Note that such compensation is far beyond the capabilities of polarization and phase tracking in conventional coherent PDM systems, which typically operate at less than a MHz speed. Finally, in FIG. 5, the negative Q factor improvement versus LPF bandwidth for a single channel 112 Gb/s 7×4 Gbaud OFDM QPSK with no 10 Gb/s neighboring channels (the crosses curve 46) is shown (as summarized from FIG. 6). As the LPF bandwidth increases, the Q factor steadily degrades from Q=14.34 dB at 7.8125 MHz LPF (see the maximum in the diamonds curve 48 in FIG. 6), as there is no nonlinear cross channel noise to compensate for, whereas the ASE noise penalty increases. Note that at zero DGD, for the optimum LPF of 2.258 GHz, the Q factor with 10 Gb/s neighboring channels and OPDBP based compensation reaches 13.3 dB (see the maximum in the crosses curve 50 in FIG. 4 at 6 dBm channel power) versus 8.18 dB at 7.8125 MHz LPF (see the maximum in the diamonds curve 52 at 5 dBm channel power in FIG. 4). Whereas for the same LPF of 2.258 GHz and no neighboring channels at all Q=13.99 dB (see the maximum in the crosses curve 54 in FIG. 6 at 6 dBm channel power), meaning that most of the XPM and XPolM noise due to the 10 Gb/s neighboring channels is compensated.

Thus, in this disclosure, a method for the significant compensation of both high speed XPolM and XPM in a test channel due to neighboring channels using an OPDBP technique has been proposed and described. The method applies to a wide range of both test channel and neighboring channel modulation formats. In the case of a 112 Gb/s PDM OFDM QPSK test channel with 10 Gb/s OOK neighboring channels, the method allows for more than 4 dB Q factor improvement (more than 5 dB with residual PMD compensation) in a 10×100 km NDSF with 90% inline dispersion compensation and is, of course, extendable to other scenarios. The optimum choice of the bandwidth between 1.5 GHz and 3 GHz, for example, for the filtering of the pilot signals is one of the key enabling features of this OPDBP technique.

Again, the XPolM tends to depolarize the signal, whereas the XPM tends to phase modulate the signal. In order to compensate for the XPolM induced depolarization, one has to capture the time evolution of the nonlinear fiber Jones matrix. To do this, one has to have at least two spectrally separable pilots in different states of polarization. For a PDM signal with H and V-polarization channels, it is convenient to place these pilots in H and V-polarizations. Thus, to compensate for both XPolM and XPM at the same time, one has to realize three operations:
1. At the Tx 22 (FIG. 2), place two spectrally separable pilots, each in the same state of polarization (SOP) as the polarization channels;
2. At the Rx 30 (FIG. 2), separate the contents of the H-pol and V-pol pilots down converted to the baseband with sufficient bandwidth and take two scalar products of two vectors, the conj (H-pol pilot vector) x (signal vector) scalar product and conj (V-pol pilot vector) x (signal vector) scalar product. The 1st scalar product restores the original H-pol signal channel, whereas the 2nd scalar product restores the original V-pol signal channel; and
3. The bandwidth around the H-pol and V-pol pilots has to be sufficient and optimized to capture fast XPolM induced polarization variation and XPM induced phase variation. The optimum bandwidth is determined by a tradeoff between the XPolM and XPM induced noise compensation and degradation due to the ASE noise as the bandwidth increases.

These three operations taken together represent significant novelty of the disclosure. More specifically, the 1st scalar product operation of two vectors, conj (H-pol pilot vector) x (signal vector), and the 2nd scalar product operation of two vectors, conj (V-pol pilot vector) x (signal vector), with optimized bandwidth around the H-pol and V-pol spectrally separable pilots to capture the fast XPolM induced polarization and XPM induced phase variations, are key concepts. Existing pilot-based compensation schemes place pilots in both H and V-polarization channels, typically at the same frequency. However, when they do that, each H-polarization pilot gets mixed up with each V-polarization pilot at the same frequency. As a consequence, the H and V-polarization pilots become spectrally inseparable. As a result, the use of the pilots does not help to capture the time evolution of the fiber Jones matrix and compensate for the XPolM induced cross polarization noise. Instead, they rely on the conventional constant modulus algorithm (CMA), multimodulus algorithm (MMA), and (or) least mean square (LMS) algorithm to perform the fiber Jones matrix tracking and polarization demultiplexing. However, as mentioned above, the speed of polarization tracking in conventional coherent PDM systems, relying on high speed ADC/DSP, is typically limited to less than a MHz due to the data processing speed and data acquisition scheme limitations. As a result, polarization variations of the signals due to the XPolM, occurring at the speed of ~1 GHz due to the 10 Gb/s neighboring channels, are far beyond the capabilities of polarization tracking using existing pilot based compensation techniques. Note that having a pilot (or many spectrally separable pilots) in only one polarization is not sufficient to capture the Jones matrix, and, hence, compensate for the XPolM induced cross polarization noise, because it lacks enough degrees of freedom for its determination.

All of the existing pilot based nonlinear compensation techniques use a product of two scalars conj (pilot field scalar) x (signal field scalar). That is, they are either the conj (H-pol pilot field scalar) x (H-pol signal field scalar) and conj (V-pol pilot field scalar) x (V-pol signal field scalar) after the digital polarization demultiplexing, or the conj (X-pol pilot field scalar) x (X-pol signal field scalar) and conj (Y-pol pilot field scalar) x (Y-pol signal field scalar) before the digital polarization demultiplexing. In either case, the product of the two scalars does not perform the function of the XPolM compensation, it only provides the XPM compensation. In the present disclosure, the optimum choice of the bandwidth for filtering of the pilot signals is key. For the 10×100 km NDSF fiber with 90% inline dispersion compensation and 10 Gb/s OOK neighboring channels, for example, this optimum bandwidth is around 2 GHz. It is important to note that without the optimum choice of the bandwidth for filtering of the pilots, the orthogonal polarization detection technique is not capable of any significant nonlinear noise compensation.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:
1. A method, in a receiver, for compensation of nonlinear cross phase polarization and cross phase modulation in a dual polarization coherent optical system, the method comprising:
receiving a dual polarization optical signal with two pilot tones, each of the two pilot tones is i) at a different frequency thereby avoiding mixing during propagation from the transmitter and ii) in a same State of Polarization (SOP) as respective data signals associated with the dual polarization optical signal;

obtaining a Horizontal polarization (H-pol) pilot and a Vertical (V-pol) polarization pilot from the received dual polarization optical signal; and determining scalar products using the H-pol pilot, the V-pol pilot, and a signal pilot, wherein the scalar products are indicative of fast nonlinear cross polarization modulation-induced polarization variations and nonlinear cross phase modulation-induced phase variations during the propagation, for use in the compensation.

2. The method of claim 1, wherein the H-pol pilot and the V-pol pilot are fully separable in frequency prior to polarization demultiplexing of electrical data signals associated with the dual polarization optical signal.

3. The method of claim 1, further comprising:

performing polarization demultiplexing of electrical data signals associated with the dual polarization optical signal, using the H-pol pilot and the V-pol pilot, wherein common mode phase noise terms, both linear laser related and nonlinear cross talk related, are compensated automatically in the polarization demultiplexing.

4. The method of claim 1, wherein the receiver is an analog Gilbert cell mixer-based receiver.

5. The method of claim 1, wherein the receiver is a Digital Signal Processor (DSP)-based receiver configured to digitally compensate Polarization Mode Dispersion.

6. The method of claim 1, further comprising:

broadband filtering the H-pol pilot and the V-pol pilot in a range up to a few GHz where an overwhelming amount of nonlinear noise due to the nonlinear cross polarization modulation and nonlinear cross phase modulation is located.

7. The method of claim 6, wherein the broadband filtering is in a range of 1.5 GHz to 3 GHz.

8. The method of claim 1, wherein the H-pol pilot and the V-pol pilot are indicative of a Jones matrix due to the propagation.

9. A method, in a transmitter, allowing for compensation of nonlinear cross phase polarization and cross phase modulation in a dual polarization coherent optical system, at a receiver, the method comprising:

inserting a Horizontal polarization (H-pol) pilot tone, at a first frequency, with a data signal associated with a Horizontal polarization;

inserting a Vertical (V-pol) polarization pilot tone, at a second frequency, with a data signal associated with a Vertical polarization, wherein the first frequency and the second frequency are different thereby avoiding mixing during propagation to the receiver; and transmitting, to the receiver, a dual polarization optical signal that includes the H-pol pilot tone, the V-pol pilot tone, the data signal associated with the Horizontal polarization, and the data signal associated with the Vertical polarization.

10. The method of claim 9, wherein the H-pol pilot tone and the V-pol pilot tone are used by the receiver to capture fast nonlinear cross polarization modulation-induced polarization variations and nonlinear cross phase modulation-induced phase variations during the propagation, based on recovering the H-pol pilot tone and the V-pol pilot tone.

11. The method of claim 9, wherein the H-pol pilot and the V-pol pilot are fully separable in frequency prior to polarization demultiplexing of electrical data signals, at the receiver, associated with the dual polarization optical signal.

12. The method of claim 9, wherein the H-pol pilot and the V-pol pilot are indicative of a Jones matrix due to the propagation from the transmitter to the receiver.

13. The method of claim 9, wherein the transmitter utilizes coherent modulation.

14. The method of claim 9, wherein the data signal associated with the Horizontal polarization and the data signal associated with the Vertical polarization are orthogonal frequency division multiplexed.

15. A system for compensation of nonlinear cross phase polarization and cross phase modulation in a dual polarization coherent optical system, the system comprising:

a transmitter configured to transmit a dual polarization optical signal with a Horizontal polarization (H-pol) pilot and a Vertical (V-pol) polarization pilot, each of the H-pol pilot and the V-pol pilot is i) at a different frequency thereby avoiding mixing during propagation from the transmitter and ii) in a same State of Polarization (SOP) as respective data signals associated with the dual polarization optical signal; and a receiver communicatively coupled to the transmitter and configured to receive the dual polarization optical signal with the two pilot tones, and determine scalar products using the received H-pol pilot, the received V-pol pilot, and a signal pilot, wherein the scalar products are indicative of fast nonlinear cross polarization modulation-induced polarization and nonlinear cross phase modulation-induced phase variations during the propagation for compensation of both using the scalar products.

16. The system of claim 15, wherein the transmitter is configured to, prior to transmitting to the receiver, insert the H-pol pilot, at a first frequency, with the respective data signal associated with a Horizontal polarization of the dual polarization optical signal, and insert the V-pol pilot, at a second frequency that is different from the first frequency, with the respective data signal associated with a Vertical polarization of the dual polarization optical signal.

17. The system of claim 15, wherein the receiver is an analog Gilbert cell mixer-based receiver.

18. The system of claim 15, wherein the receiver is a Digital Signal Processor (DSP)-based receiver configured to digitally compensate Polarization Mode Dispersion.

19. The system of claim 16, wherein the transmitter utilizes coherent modulation.

20. The system of claim 16, wherein the data signal associated with the Horizontal polarization and the data signal associated with the Vertical polarization are orthogonal frequency division multiplexed.

* * * * *